UNITED STATES PATENT OFFICE.

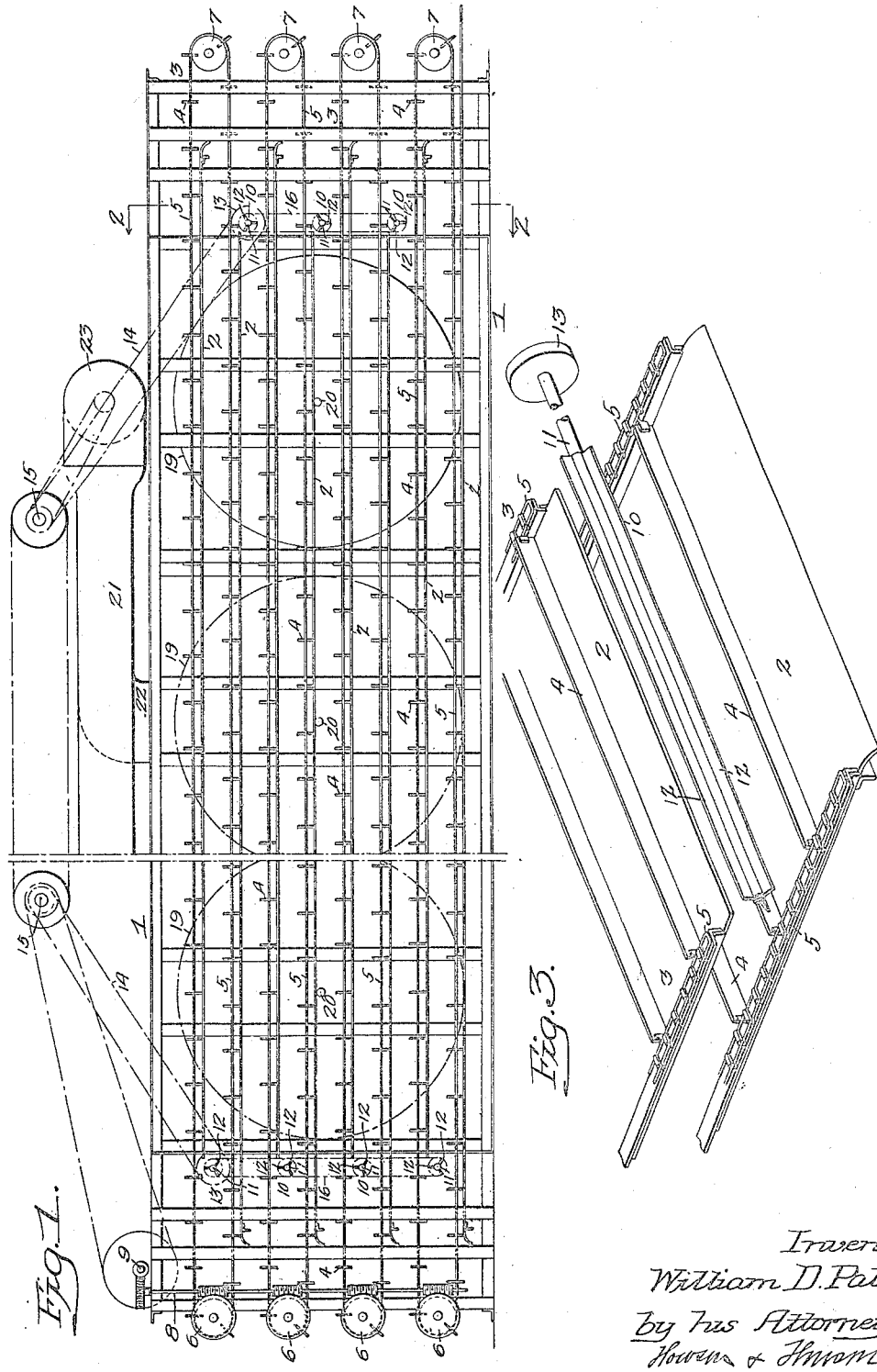

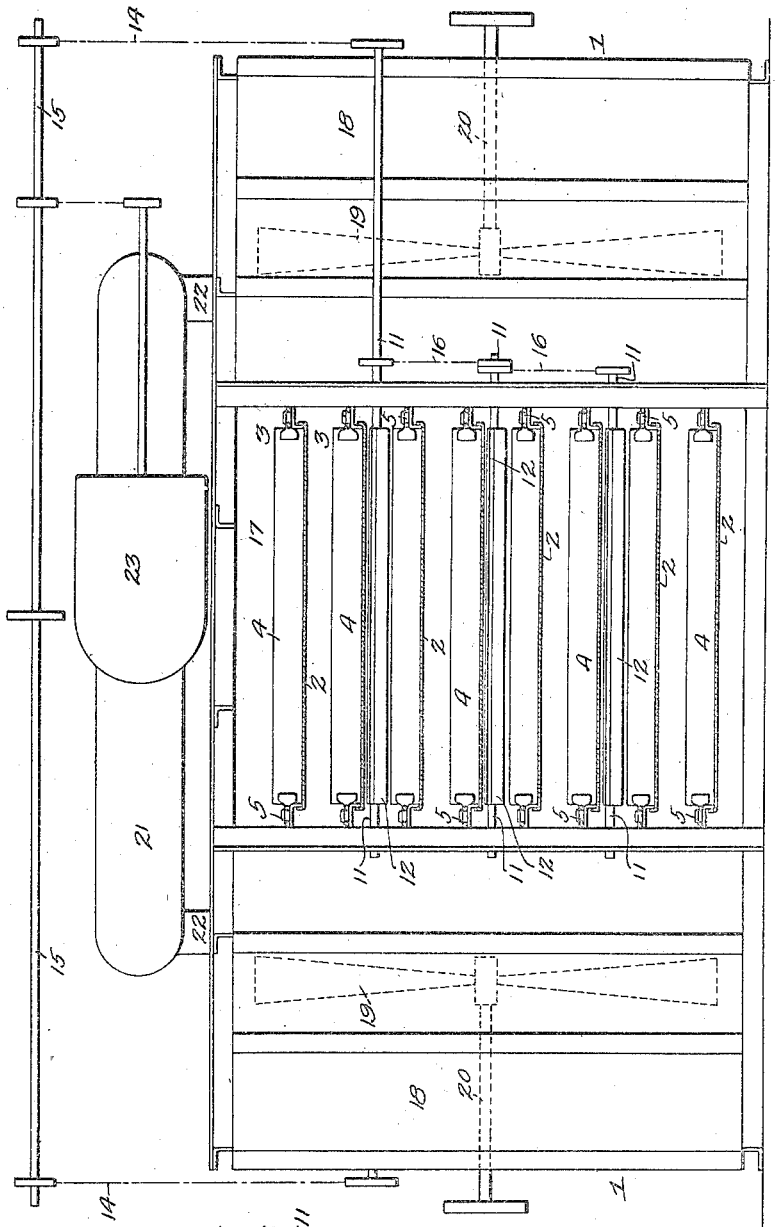
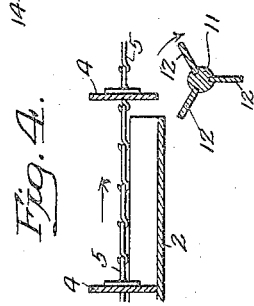

WILLIAM D. PALEN, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

DRIER.

1,248,389.    Specification of Letters Patent.    Patented Nov. 27, 1917.

Application filed May 3, 1916.   Serial No. 95,085.

*To all whom it may concern:*

Be it known that I, WILLIAM D. PALEN, a citizen of the United States, residing in Philadelphia, Pennsylvania, have invented certain Improvements in Driers, of which the following is a specification.

My invention relates to certain improvements in driers in which a series of drag conveyers is used whereby the loose material being dried is carried over a platform and is discharged at the end thereof into another platform and is then conveyed in another direction and is discharged from one platform to another, being finally discharged from the drier. Heretofore, the material was allowed to fall from one platform to another in a mass and, consequently, it was not properly distributed.

The object of my invention is to provide means for distributing the material, as it is discharged from one platform to another, so that it will be more thoroughly dried than heretofore.

In the accompanying drawings:

Figure 1 is a vertical sectional view of a drier illustrating my invention;

Fig. 2 is a transverse sectional view of the drier on the line 2—2, Fig. 1;

Fig. 3 is a perspective view illustrating the feature of my invention; and

Fig. 4 is an enlarged diagram showing the relation of the distributer to the end of a platform.

My invention is particularly adapted for use as a drier for drying loose material, such as reclaimed rubber, where it is essential that the material shall be evenly distributed after it is discharged from one conveying platform to another, but it will be understood that it may be used for other material which can be carried through a drier by a drag conveyer.

Referring to the drawings, 1 is the casing of the conveyer. 2, 2 are the platforms, one arranged above another and extending substantially the full length of the machine. 3, 3 are endless conveyers having flights 4, which extend substantially the full width of the platforms. These conveyers are connected to ordinary open link chains 5, which form the conveyer 3 and the flights are connected to the links of these chains by the usual standard attachments. The conveyer chains pass around sprocket wheels 6 and 7.

The sprocket wheels 6 are at one end of the machine and are driven by a vertical shaft 8 through worm gearing, as shown in Fig. 1, and this vertical shaft is driven from a transverse power shaft 9 mounted in the top of the drier through worm and worm gearing so that the conveyers travel very slowly through the drier. The conveyers are what are termed "flight" or "drag" conveyers, as they push the material over a platform 2.

It will be noticed that the upper run of each conveyer moves the material in one direction over one platform and the return run of each conveyer moves the material in the opposite direction over the platform directly below the first mentioned platform. The discharge end of each platform terminates short of the end of the platform next below it so that the material will fall from the discharge end of one conveyer onto the receiving end of the conveyer directly below it.

In order to prevent the material from discharging in piles on the receiving end of a platform, I provide a rotating distributer 10, which consists of a transverse shaft 11 having three blades 12, although the number of these blades may be varied without departing from the essential features of the invention. At one end of the upper shaft 11 is a belt pulley 13 around which passes a belt 14 from an overhead shaft 15. The two overhead shafts are driven in unison. The several shafts 11 at each end of the machine are connected by belts 16, so that they will all be driven in one direction. As the material is forced off of the end of one platform it is caught by the revolving blades of a distributer and is spread over the surface of the platform next below it. Then the material is fed on this platform by the conveyers traveling in the opposite direction from the one above.

In the present instance, at each side of the conveying chamber 17 are heating chambers 18 and fans 19 on shafts 20 circulate the air across the drier in the manner common to this type of machine. There are air ducts 21 above the machine connected by ducts 22 with certain portions of the drier and to an exhaust fan 23 so as to exhaust the moist air from the drying chamber as the material is dried. Suitable air intakes are provided which are not shown in the present instance. The method of drying and circulating the air is that commonly used in this type of machine, therefore, I have not shown it in detail.

I claim:

1. The combination in a drier, of a chamber; two platforms, one located above the other in said chamber, the lower platform extending beyond the upper one; a flight conveyer adapted to travel on the platforms; sprocket wheels for the conveyers located beyond the platforms; a rotary distributer having blades located below and beyond the discharge end of the upper platform and clear of the conveyer so that the material accumulated in front of the flights of the conveyer on the upper platform will be discharged onto the distributer and will fall from said distributer onto the lower platform.

2. The combination in a drier, of a chamber; a series of platforms located one above another in said chamber, the alternate platforms extending beyond the others at one end of the drier, the other platforms extending beyond the first mentioned ones at the opposite end thereof; a series of endless conveyers having flights arranged to travel over the platforms; sprocket wheels for the conveyers located some distance beyond the ends of the platforms; a distributer having blades located below and beyond the delivery end of each platform so that the flight of the conveyers will clear the distributer; and means for rotating the distributers so that the material accumulated in front of each flight on the platforms will fall onto the distributer and will be finally discharged onto the surface of the next lower platform.

WILLIAM D. PALEN.

Copies of this patent may be obtained for five cents each, by addressing the "Commissioner of Patents, Washington, D. C."